(12) United States Patent
Hermann et al.

(10) Patent No.: US 6,685,413 B2
(45) Date of Patent: *Feb. 3, 2004

(54) CONNECTION ELEMENT FOR CONNECTING A BOLT-SUPPORTED PART WITH THE SUPPORTING BOLT

(75) Inventors: Fritz Hermann, Landsberg (DE); Ulrich Birnbaum, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 59 days.

This patent is subject to a terminal disclaimer.

(21) Appl. No.: 10/014,134

(22) Filed: Oct. 8, 2001

(65) Prior Publication Data

US 2002/0048500 A1 Apr. 25, 2002

(30) Foreign Application Priority Data

Oct. 23, 2000 (DE) .......................................... 100 52 578

(51) Int. Cl.⁷ ................................................. F16B 37/08
(52) U.S. Cl. ........................ 411/433; 411/438; 411/265
(58) Field of Search ................................. 411/265, 266, 411/267, 278, 433, 437, 438

(56) References Cited

U.S. PATENT DOCUMENTS

| | | | | |
|---|---|---|---|---|
| 2,569,989 A | * | 10/1951 | Harding | |
| 2,724,297 A | * | 11/1955 | Mercer | |
| 4,974,888 A | * | 12/1990 | Childers | |
| 5,098,241 A | * | 3/1992 | Aldridge | |
| 5,340,252 A | * | 8/1994 | Weddendorf | |
| 5,468,105 A | * | 11/1995 | Iwamoto | |
| 5,980,176 A | * | 11/1999 | Akashi | |
| 6,305,889 B1 | * | 10/2001 | Blessing | |
| 6,461,091 B2 | * | 10/2002 | Herb | |

* cited by examiner

Primary Examiner—Flemming Saether
(74) Attorney, Agent, or Firm—Sidley Austin Brown & Wood, LLP

(57) ABSTRACT

A connection element for a bolt and having a bolt-receiving member (1) the bore of which has a cylindrical receiving region (4) and a tapering, at least sectionally, in a direction opposite to an insertion direction (A) of the bolt (2), region (7) that adjoins the cylindrical receiving region (4) at its side facing in the direction opposite the insertion direction (A), a guide region (11) that adjoins the cylindrical receiving region (4) at its insertion direction side and has an inner diameter (d3) which at most corresponds to an outer diameter of the bolt; and at least one locking member (8) arranged in the bore (5), formlockingly engaging, at least partially, in the outer thread (3) of the bolt (2), and formed as a radially expandable ring body.

6 Claims, 1 Drawing Sheet

CONNECTION ELEMENT FOR CONNECTING A BOLT-SUPPORTED PART WITH THE SUPPORTING BOLT

BACKGROUND OF THE INVENTION

1. Field of the Invention

The present invention relates to a connection element for a bolt having an outer thread and including a member for receiving the bolt and having a bore through which the bolt extends, with the bore having a cylindrical receiving region and a tapering, at least sectionally, in a direction opposite to an insertion direction of the bolt, region that adjoins the cylindrical receiving region at its side facing in the direction opposite the insertion direction, and with the connector further including a locking member arranged in the bore and formlockingly engaging, at least partially, in the outer thread of the bolt for retaining the bolt in the bore, the locking member being formed as a radially expandable ring body an inner width of which is at least partially smaller than the outer diameter of the bolt and an axial length of which somewhat corresponds to a length of the cylindrical receiving region.

2. Description of the Prior Art

A threaded connection, which is one of the most used techniques of forming a connection, usually consists of two or more elements, generally, a threaded connection is formed by a bolt having an outer thread and a nut with a corresponding inner thread. A to-be-connected part can be connected with the bolt or the nut. Often, a bolt forms a component of the connectable part itself. The second connectable part, in this case is generally provided with a bore through which the bolt extends. The connection becomes fixed by screwing the nut on the bolt. Alternatively, a nut can constitute a component of a to-be-connected part. In this case, the bolt is screwed into the nut, extending through a bore of another to-be-connected part. The bolt can also be formed as a threaded rod connectable with a mounting for a pipe.

Known are connection in which for retaining a bolt, a connection element with an expandable ring body that engages in the outer thread of a bolt is used. The use of an expendable ring body provides for a simple and rapid connection. The drawback of the known connections consists in that they can transmit a very small torque. E.g., when a connection element is mounted on pipe shell to provide for connection with a threaded rod, it should be secured to a construction component with a dowel which is expanded by drilling. In this case, drilling of the pipe shell is not enough as the connection element does not transmit the torque adequately.

Accordingly, an object of the present invention is to provide a connection element with locking means engaging at least partially in the outer thread of a bolt and which insures an adequate transmission of a torque.

SUMMARY OF THE INVENTION

This and other objects of the present invention, which will become apparent hereinafter, are achieved by providing a connection element of a type described above in which the receiving member has a guide region that adjoins the cylindrical region at its insertion direction side and has an inner diameter which at most corresponds to an outer diameter of the bolt.

By providing, in the receiving member, a guide region having an inner diameter that does not exceed the outer diameter of the bolt, it is insured that the bolt is retained in the receiving member upon application of torque thereto. The guide region functions somewhat like a brake. As a result, the connection can be subjected to higher torques than the conventional connections.

Advantageously, the inner or root diameter of the guide region corresponds to the outer diameter of the bolt. In this case, there is provided a stop which adjoins the guide region at its insertion-direction side. The stop, which can be formed by a wall of the connection element, presents the extension of the bolt beyond the connection element.

Advantageously, the guide region has an inner thread arranged coaxially with the bolt receiving bore. Preferably, a frictional insert, which has a high friction coefficient, can be mounted in the guide region. Such an insert can be formed e.g., of plastic or elastometric material. When an insert is used, it is the insert that is provided with the thread. When a torque, which acts in a screw-in direction of the thread, is applied to the bolt, the bolt is subjected to high frictional forces which prevent the bolt from rotation.

Advantageously, the root diameter of the thread of the guide region is smaller than the outer diameter of the bolt, whereby a reliable force and/or frictional locking connection is provided between the receiving member and the bolt. In particular, a frictional insert substantially increases the friction between the connection member and the bolt. In addition, providing a guide region thread having a root diameter smaller than the outer diameter of the bolt insures an optimal wedging, e.g., of corners and edges of the receivable end of the bolt in the guide region. The wedging is particularly pronounced when so-called stock screws with a conical end are used.

In order to insure that the connection is usable to withstand sufficiently high torques, the inner thread of the guide region should have at least 1.5 turns. Advantageously, in order to insure a cost-effective production of the connection members, they are formed as one-piece members.

Advantageously, the guide region of the receiving member is formed by radially deforming inward a material of a wall of the receiving member at its insertion direction side by using a flanging process, and by, thereafter, axially expanding a deformed region with a die to form the guide region with a predetermined diameter.

The novel features of the present invention, which are considered as characteristic for the invention, are set forth in the appended claims. The invention itself, however, both as to is construction and its mode of operation, together with additional advantages of objects thereof, will be best understood from the following detailed description of preferred embodiment, when read with reference to the accompanying drawings.

DETAILED DESCRIPTION OF THE PREFERRED EMBODIMENT

Figure 1:
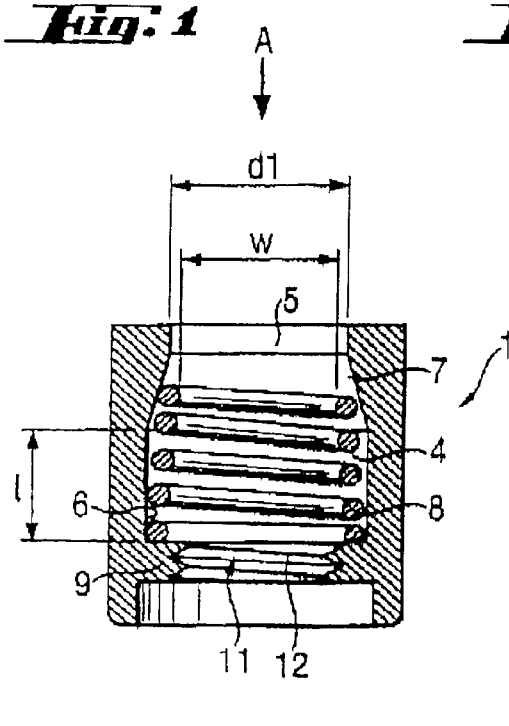
FIG. 1. a cross-sectional view of a connection element according to the present invention.

A connection element according to the present invention, which is shown in FIGS. 1–4, has a receiving member 1 and a locking member formed as an annular member and located in the receiving region 4 of the receiving member 1. The receiving member 1 can be formed as a separate part, e.g., as a nut. The receiving member 1 can also be formed as an integral component of a connection part, e.g., of a tubular shell for receiving a threaded rod.

A bore 5, which is formed in the receiving member 1 has, adjacent to the cylindrical receiving region 4, in which a bolt 2 with an outer thread 3 is received, a tapering region 7 tapering inward in a direction opposite the insertion direction A of the bolt 2. Adjacent to the tapering region 7, the bore 5 has, at end thereof remote from the receiving region 4, a cylindrical section a diameter D1 of which is only slightly bigger than the diameter d2 of the bolt 2.

A locking member is formed as a radially elastically expandable, helical spring 8, which has a shape of truncated cone. The spring 8, which is formed as a ring body, is supported against a shoulder 9 formed in the bore 5 and facing in a direction opposite the insertion direction A. At its opposite end, the helical spring 8 is supported against the tapering region 7 of the bore 5. The helical spring 8 is formed advantageously of a spring steel and has, in its unstressed condition, a length which is greater than the axial length 1 of the receiving region 4. The diameter of the helical spring 8, at its end facing the receiving region 4, is so selected that the spring 8 contacts the wall 6 of the bore 5. At its end facing in the direction opposite the insertion direction, the inner diameter w of the spring turn is smaller than the diameter D2 of the bolt 2.

Upon insertion of the bolt 2 in the bore 5, the length of the helical spring 8 shortens which results in an expansion of the radial space in the receiving region 4. When the bolt 2 is inserted, the prestress, which resulted from the shortening of spring 8, causes the spring 8 again to snap over or around the bolt 2, and the spring 8 occupies again its initial, radially prestressed position. In this way, the spring 8, which engages in the outer thread 3, connects the bolt 2 with the receiving member 1. Upon application of a tensioning load, the helical spring 8 is pressed against the tapering region 7 of the bore 5, which prevents radial expansion and, thereby, oversnapping. The helical spring 8 engages in the outer thread 3 of the bolt 2 even more, providing for a positive connection of the bolt 2 with the receiving member 1.

Figure 3:
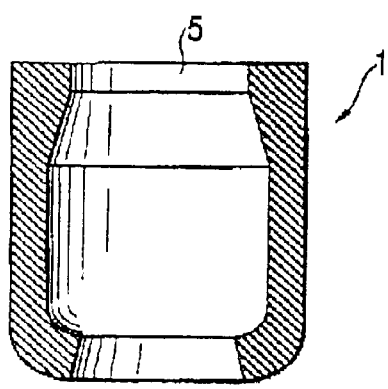
FIG. 3. a cross-sectional view of a blank for a receiving member for a connection element shown in FIG. 1.
Figure 4:
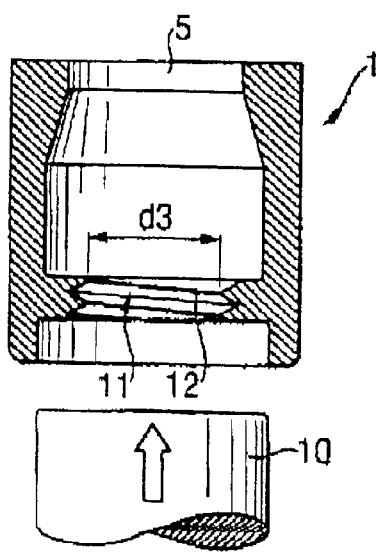
FIG. 4. a cross-sectional view of the receiving member shown in FIG. 3 after embossing process.

For manufacturing the connection element according to the present invention, the wall material at the insertion direction, end region of the sleeve-shaped receiving member, as it is particularly shown in FIG. 3, is deformed radially inward by using a flanging process. Then, with a die 10, this end region is so expanded that within the receiving member, a guide region 11 with a root diameter d3 smaller than the diameter d2 of the bolt 2 is formed.

Figure 2:
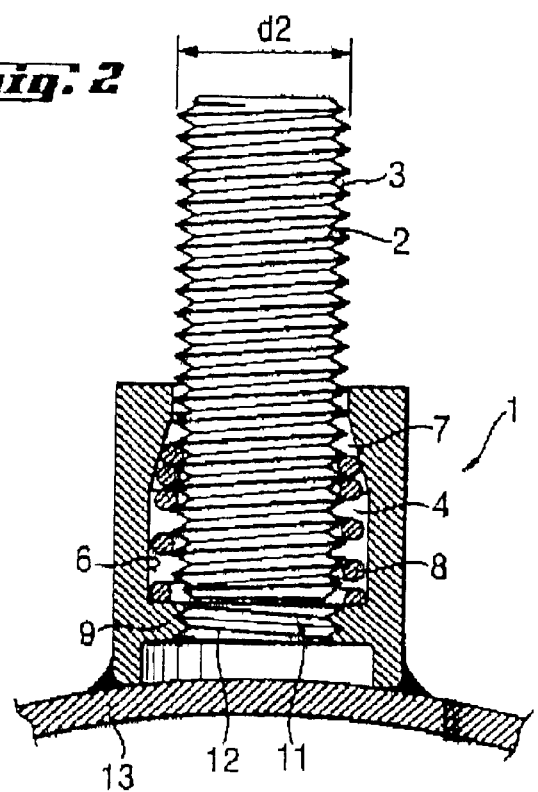
FIG. 2. a cross-sectional view of the connection element shown in FIG. 1, with a stop.

In FIG. 2, the root diameter of the inner thread 12 of the shoulder 9 corresponds to the outer diameter d2 of the bolt 2. However, in order to prevent slip of the bolt 2, there is provided, adjacent to the guide region 11, a stop 13. The stop 13 can be formed, e.g., by a stirrup formed of a tubular shell.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiment within the spring and scope of the present invention as defined by the appended claims.

What is claimed is:

1. A connection element for a bolt (2) having an outer thread (3), comprising a member (1) for receiving the bolt (2) and including a bore (5) through which the bolt (2) is to be extended, the bore (5) having a cylindrical receiving region (4), and a tapering, in a direction opposite to an insertion direction (A) of the bolt (2), region (7) that adjoins the cylindrical receiving region (4) at a side thereof facing in the direction opposite the insertion direction (A), the receiving member (2) further including a guide region (11) that adjoins the cylindrical receiving region (4) at an insertion direction side thereof and has an inner diameter (d3) which at most corresponds to an outer diameter of the bolt; and at least one locking member (8) arranged in the bore (5) and form lockingly engaging, at least partially, in the outer thread (3) of the bolt (2) for retaining the bolt (2) in the bore (5), the locking member (8) being formed as a radially expandable ring body an inner width (2) of which is at least partially smaller than the outer diameter (d2) of the bolt (2) and an axial length of which corresponds to a length (1) of the cylindrical receiving region (4), wherein the guide region (11) has an inner thread (12) arranged coaxially with the bore (5).

2. A connection element according to claim 1, wherein the inner diameter (d3) forms the root diameter of the inner thread (12) and is smaller than an outer diameter (d2) of the bolt (2).

3. A connection element according to claim 1, wherein the inner thread (12) has at least 1.5 threads.

4. A connection element according to claim 1, wherein the member (1) is for receiving the bolt, formed as one piece member.

5. A connection element according to claim 1, further comprising a stop (3) arranged downstream of the guide region (4) for preventing extension of the bolt beyond the connection element.

6. A connection element for connecting a part-to-be-supported by a bolt (2) having an outer thread (3) with the bolt (2), the connection element comprising a member (1) for receiving the bolt (2) and fixedly securable to the part, the member (1) having a bore (5) through which the bolt (2) is to-be-extended, the bore (5) having a cylindrical receiving region (4), and a tapering, in a direction opposite to an insertion direction (A) of the bolt (2), region (7) that adjoins the cylindrical receiving region (4) at a side thereof facing in the direction opposite the insertion direction (A), the receiving member (1) further including a guide region (11) that adjoins the cylindrical receiving region (4) at an insertion direction side thereof and has an inner diameter (d3) which at most corresponds to an outer diameter of the bolt; and at least one locking member (8) arranged in the bore (5) and formlockingly engaging, at least partially, in the outer thread (3) of the bolt (2) for retaining the bolt (2) in the bore (5), the locking member (8) being formed as a radially expandable ring body an inner width (w) of which is at least partially smaller than the outer diameter (d2) of the bolt (2) and an axial length of which somewhat corresponds to a length (1) of the cylindrical receiving region (4).

* * * * *